Aug. 27, 1929.  F. B. THOMPSON  1,725,944
FILM PRINTER
Filed May 28, 1924  11 Sheets-Sheet 1
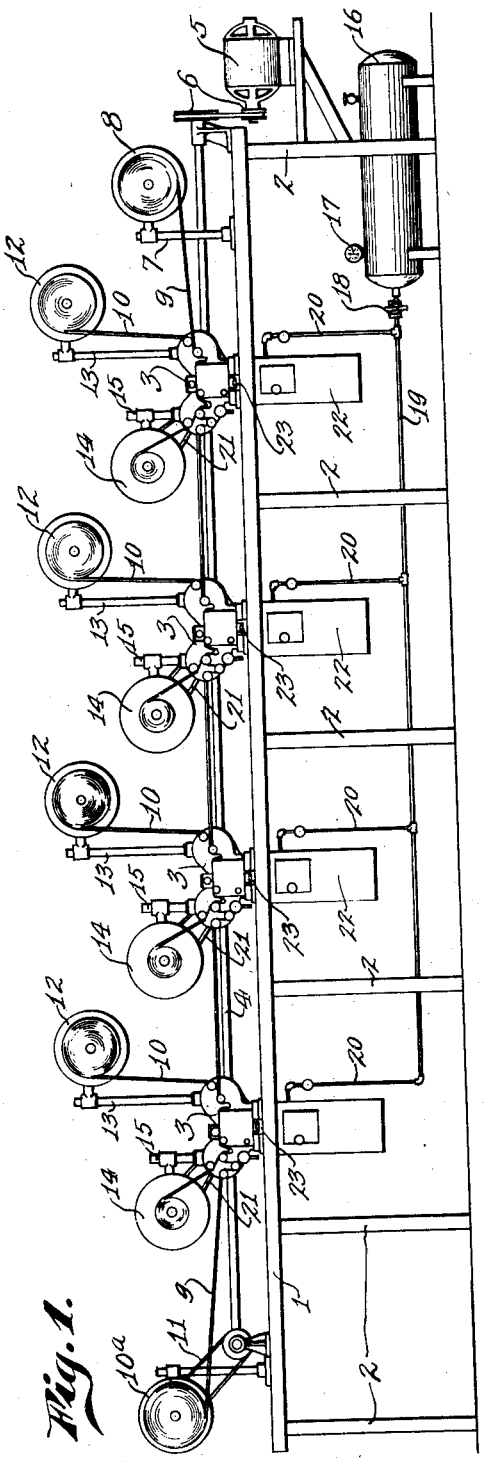
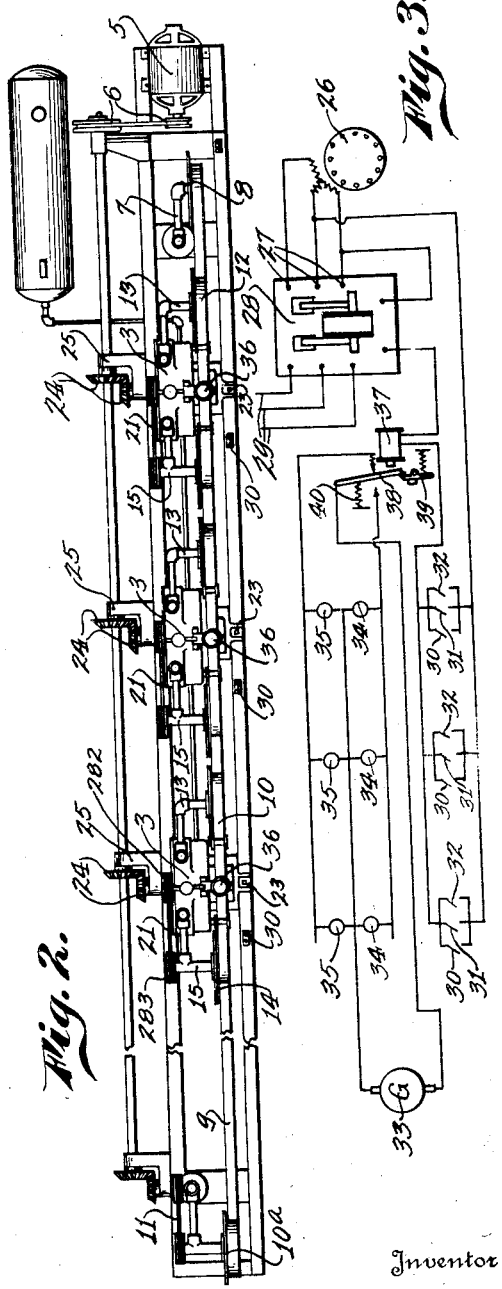
Inventor
Fredrick B. Thompson
By Lyon & Lyon
Attorney

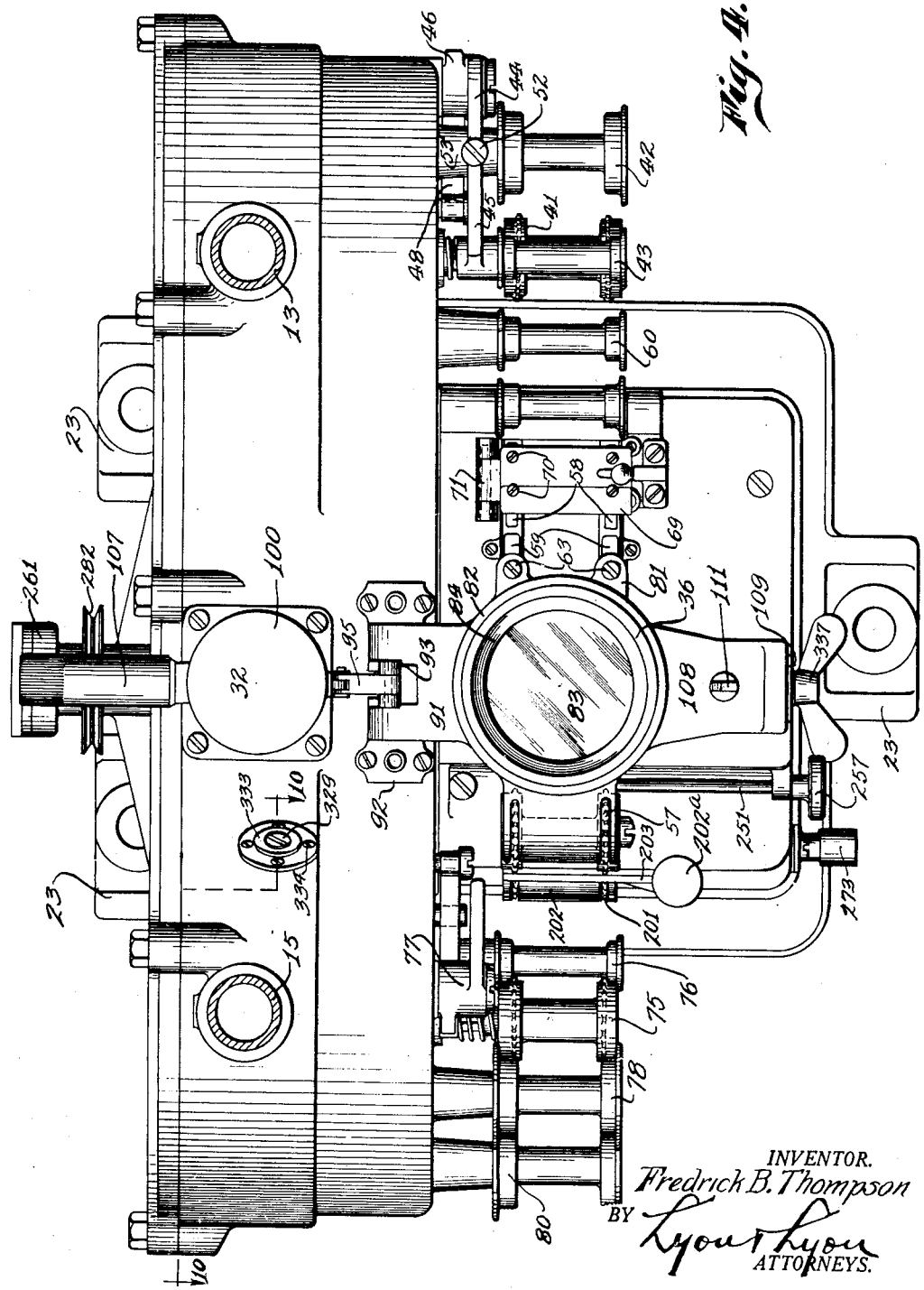

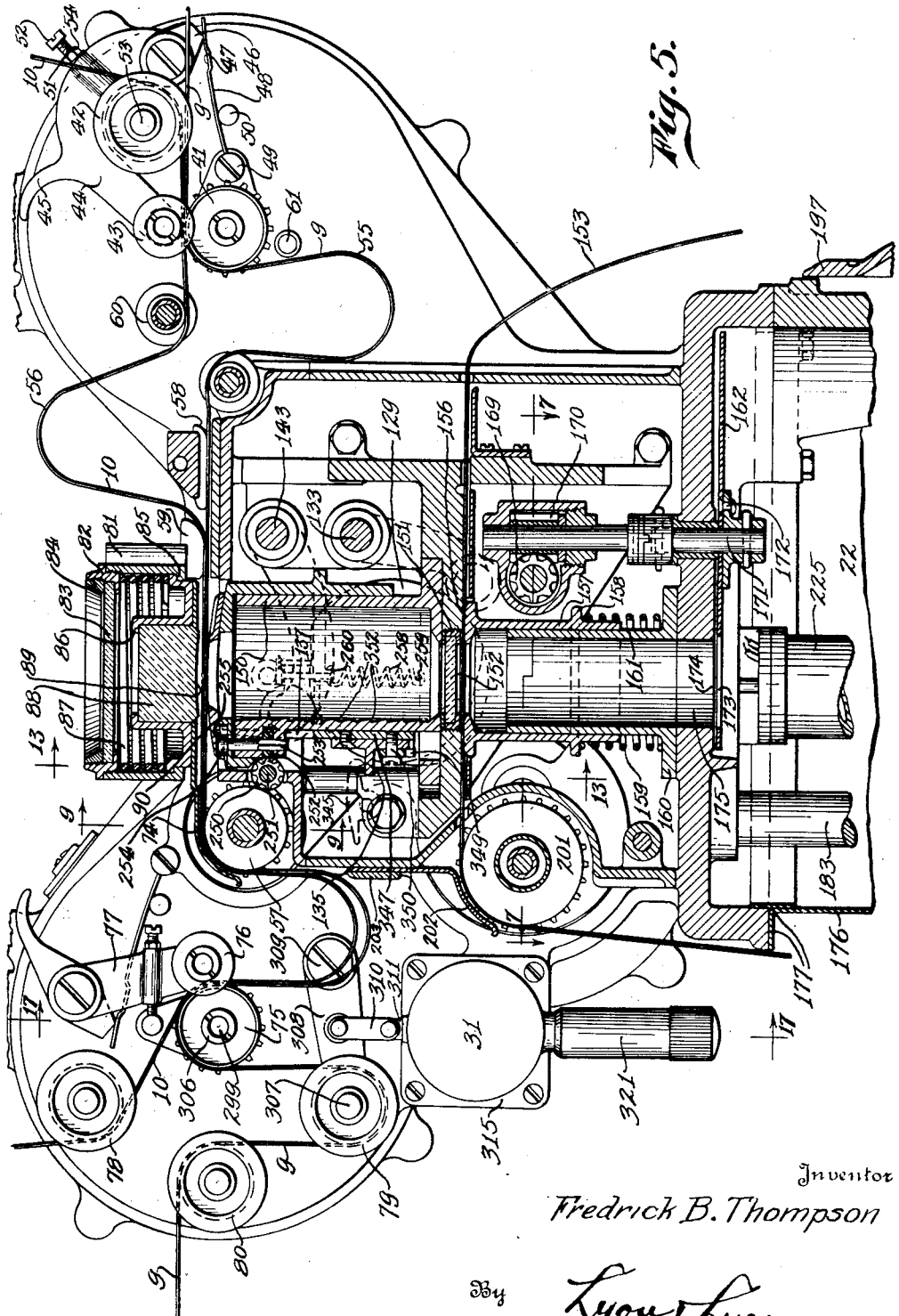

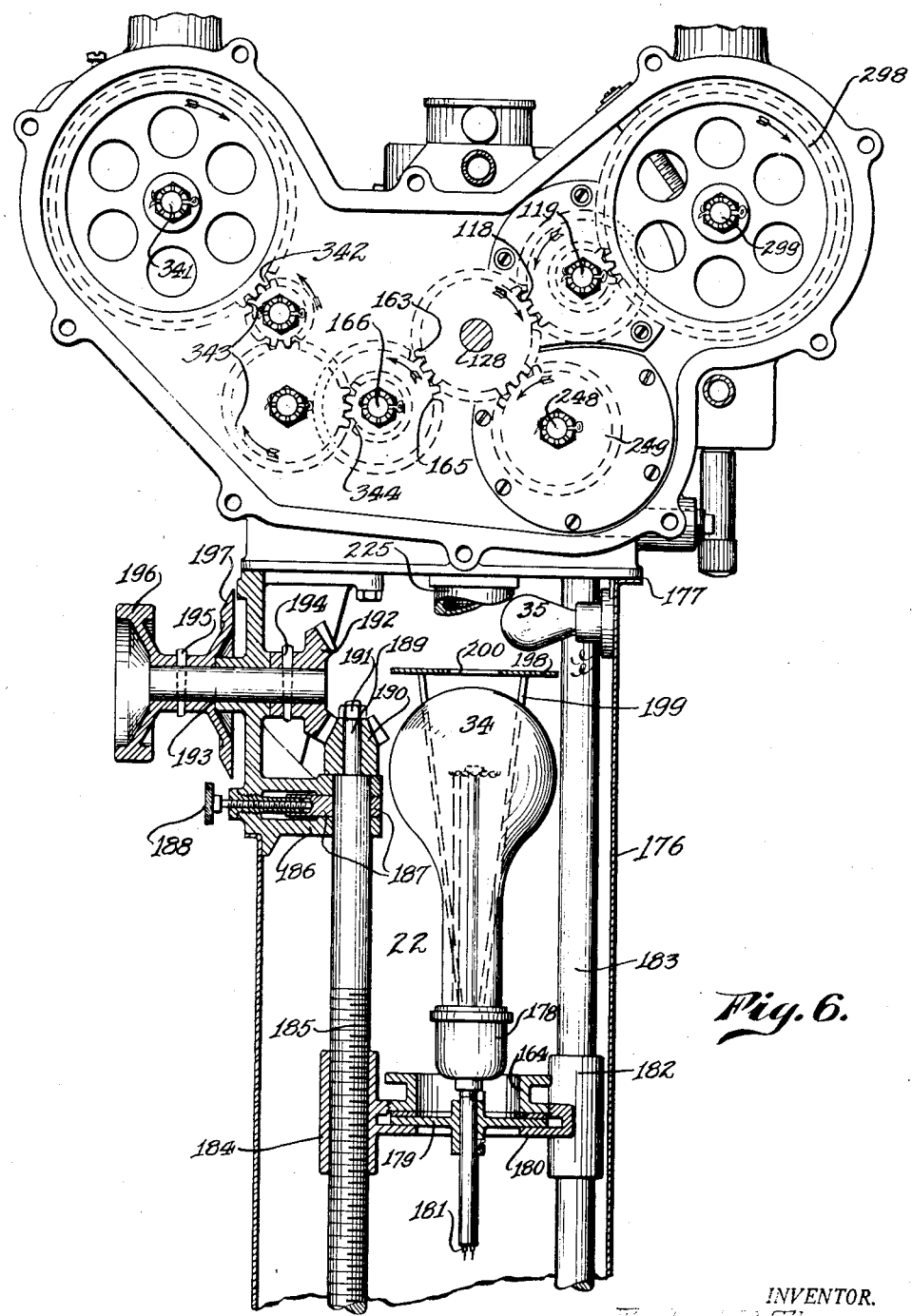

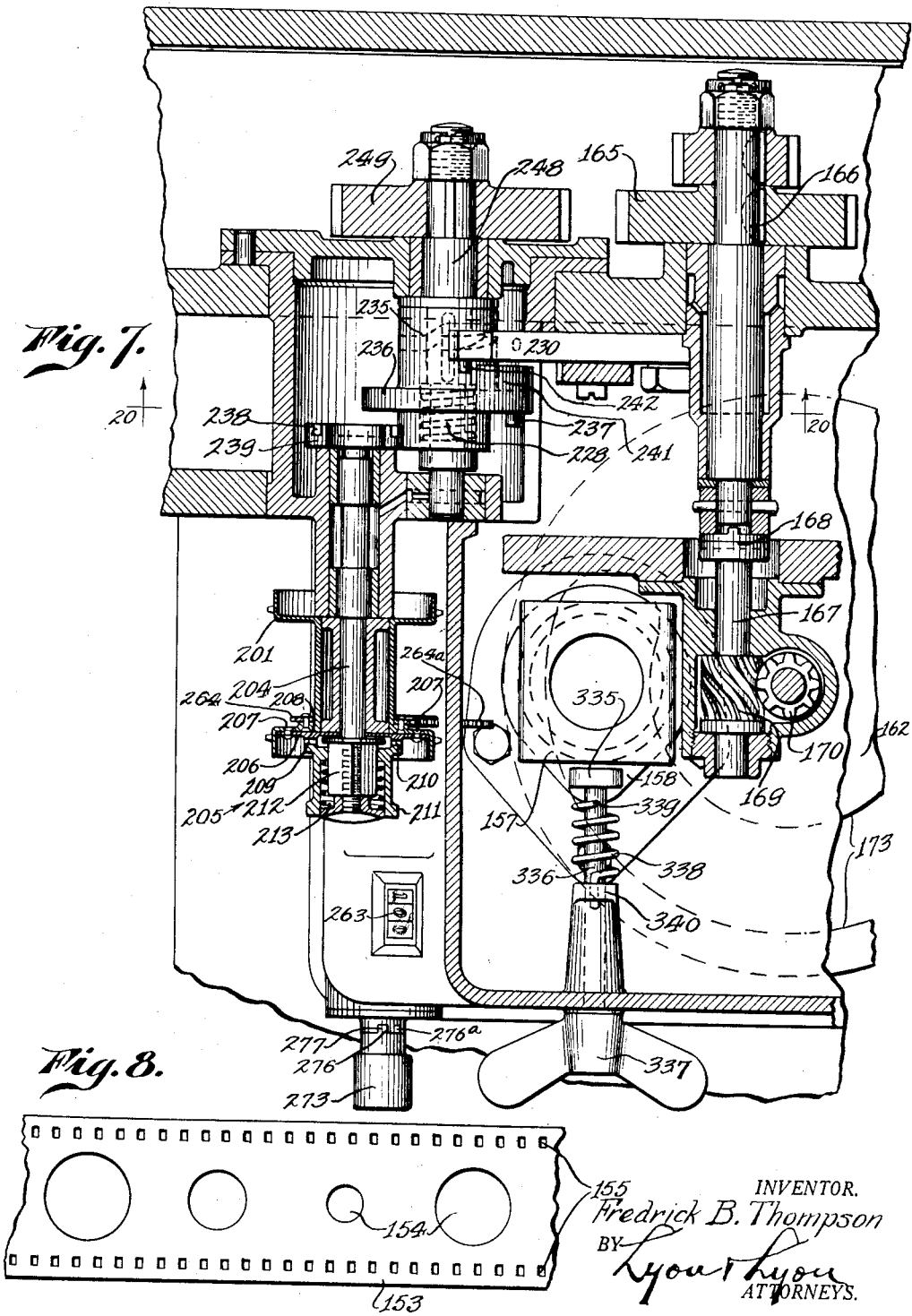

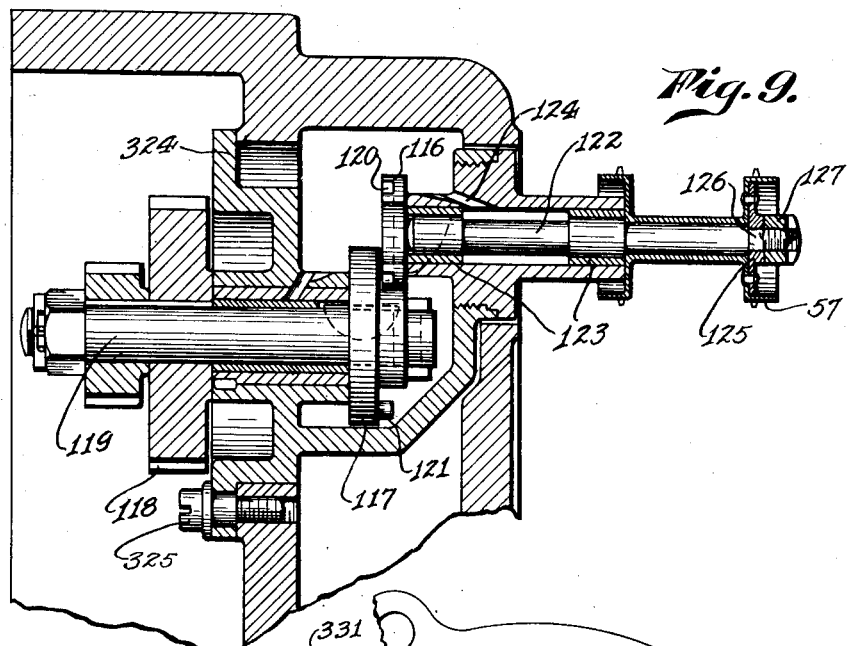

Aug. 27, 1929.  F. B. THOMPSON  1,725,944
FILM PRINTER
Filed May 28, 1924   11 Sheets-Sheet 7

INVENTOR.
Fredrick B. Thompson
BY Lyon & Lyon
ATTORNEYS.

Aug. 27, 1929.  F. B. THOMPSON  1,725,944
FILM PRINTER
Filed May 28, 1924   11 Sheets-Sheet 9
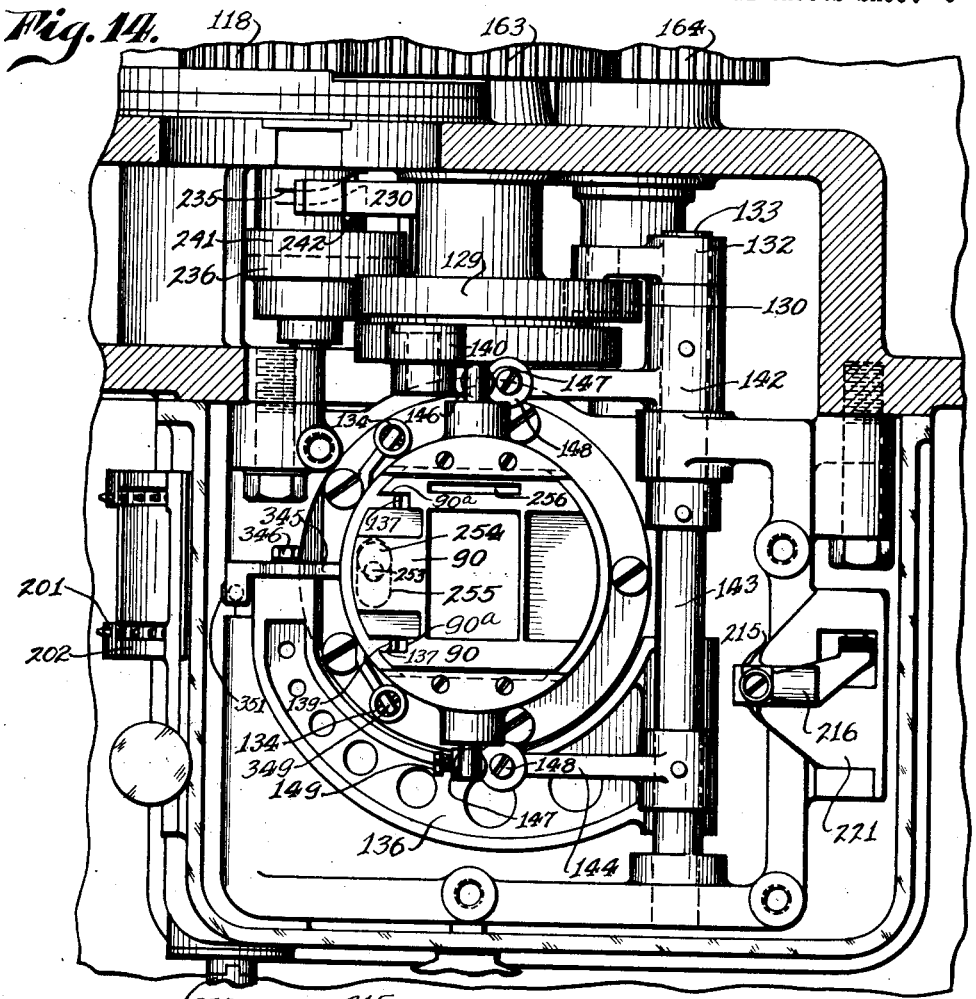
Fig. 14.
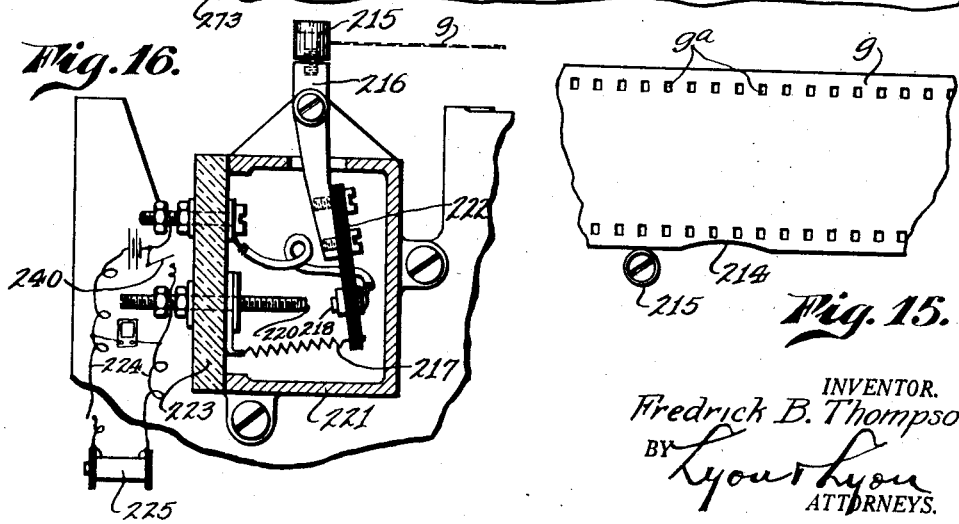
Fig. 16.
Fig. 15.
INVENTOR.
Fredrick B. Thompson
BY
ATTORNEYS.

Aug. 27, 1929.  F. B. THOMPSON  1,725,944
FILM PRINTER
Filed May 28, 1924   11 Sheets-Sheet 10
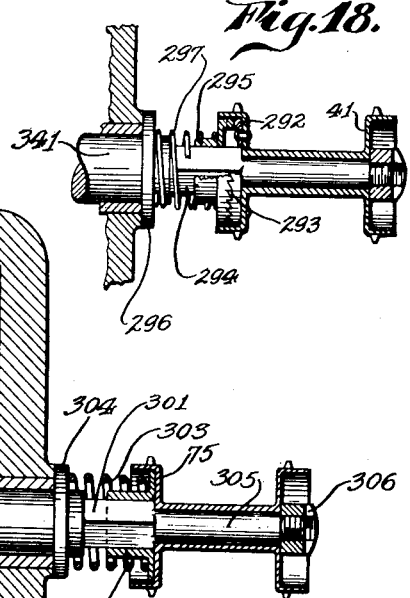
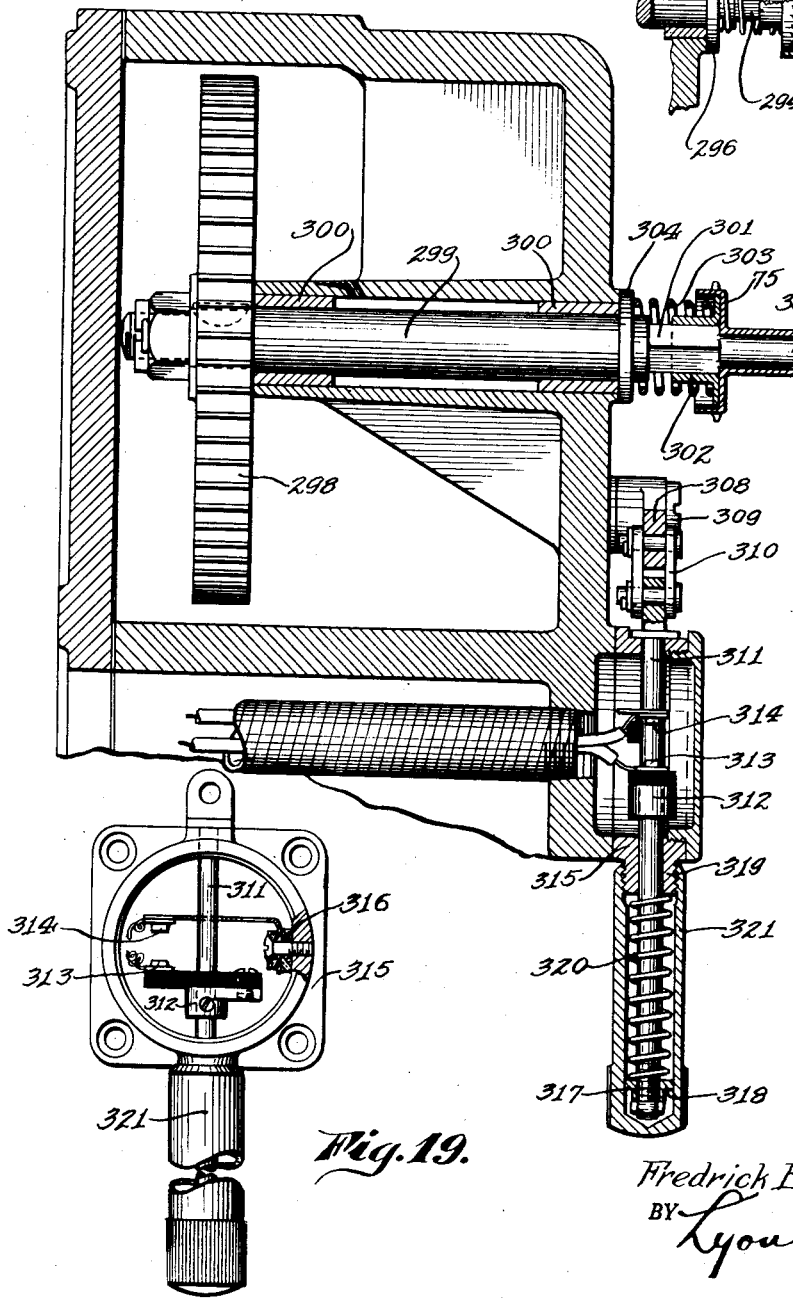
INVENTOR.
Fredrick B. Thompson
BY Lyon & Lyon
ATTORNEYS.

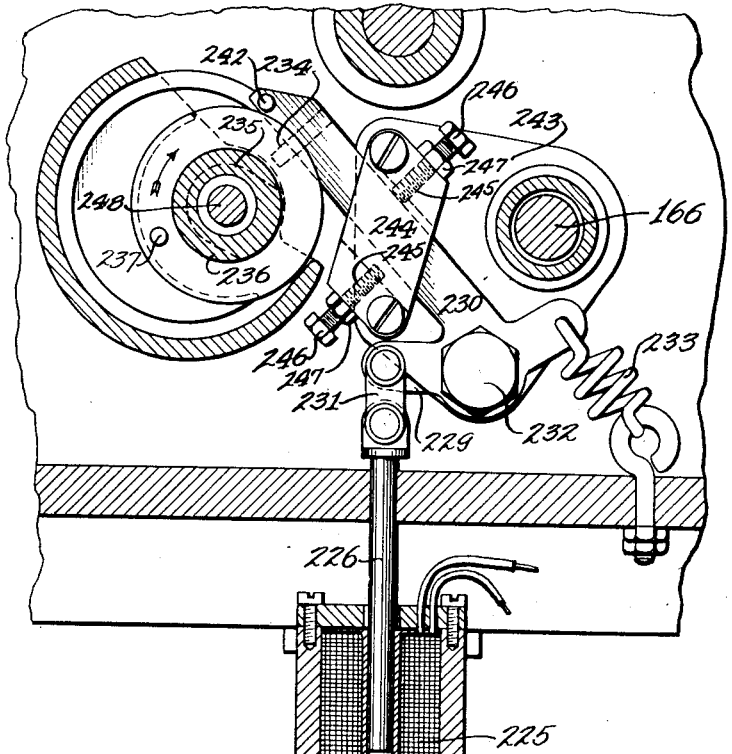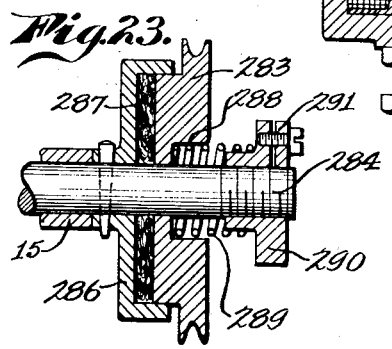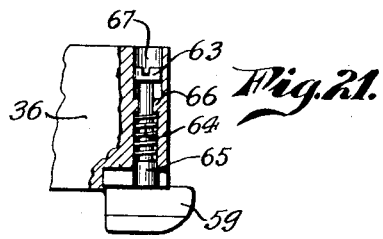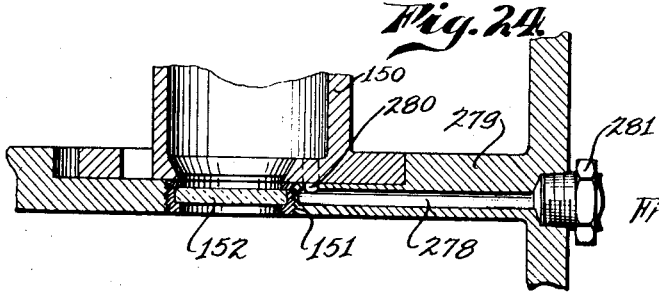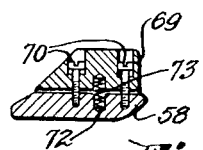

Patented Aug. 27, 1929.

1,725,944

UNITED STATES PATENT OFFICE.

FREDRICK B. THOMPSON, OF HOLLYWOOD, CALIFORNIA, ASSIGNOR, BY DECREE OF COURT, TO SPOOR-THOMPSON MACHINE COMPANY, A CORPORATION.

FILM PRINTER.

Application filed May 28, 1924. Serial No. 716,409.

This invention relates to film printers and is more particularly directed to a film printer unit adapted to be connected in a gang or multiplicity of units for the production of a multiplicity of positive prints from a single negative, means being provided for obtaining a uniform light intensity in each unit according to the light desired in the scene passing through the unit.

Film units, as heretofore designed and constructed, have been more or less unsatisfactory due to the inability to maintain definite light intensities throughout the changes of light intensity required by the different scenes of the photographic film. Also these film printers have been slow in action and limited, for the most part, to the production of one positive from a negative during one run of the negative.

In this film printer it is proposed to vary the light intensity for the scene being developed by a change of size of an orifice admitting light to the printing region. This change in size of the orifice to be accomplished by means of a light strip which may be similar in every respect to a photographic film. That is, as to size, shape and the perforations in the sides of the film. In order to provide the change of light orifices, there will be cut in this light strip a number or plurality of holes or orifices so calculated as to size as to admit the proper light intensity to the printing region at their time desired. The change of orifices may be automatically provided for in conjunction with grooves cut in the side of the negative film at the places or points where it is desired to make a change in light intensity admitted to the printing region.

This film printer also contemplates the use of a continuous draught of air for the purpose of contacting the negative film with the positive print at or in the printing region.

An object of this invention may be to provide a film printer in which means are provided for automatically varying the light intensity admitted to the printing region at or when required therein.

An object of this invention is to provide a film printer constructed of unit design so that the film printers may be assembled in a gang for the continuous production of a plurality of positive prints from a single negative.

An object of this invention may be to provide means for intermittently contacting the negative film with the positive print in the printing region.

An object of this machine may be to provide a film printer which is entirely automatically controlled, and in which means are provided to safeguard the negative film and the sensitized films.

An object of this invention may be to provide automatic means for centering the negative and the sensitized films in the printing zone.

Other objects and advantages of this invention will be apparent from the following detailed description of a preferred embodiment of this invention as illustrated in the accompanying drawings.

Figure 1 is a side elevation of a gang of film printers embodying this invention.

Fig. 2 is a plan view of the gang of film illustrated in Fig. 1.

Fig. 3 is a diagram of the electrical connections.

Fig. 4 is a plan view of a single unit of a film printer embodying this invention.

Fig. 5 is a central front sectional side elevation of the film printer illustrated in Fig. 4 with the light box cut away.

Fig. 6 is a rear elevation of a film printer embodying this invention with the gear cover removed and illustrating the light box or chamber in a sectional rear elevation.

Fig. 7 is a sectional plan view taken substantially on the line 7—7 of Fig. 5, illustrating the Geneva drive actuating means for the light strip.

Fig. 8 is a plan view of the light strip employed in conjunction with this invention, illustrating a number of different apertures or orifices cut therein.

Fig. 9 is a sectional plan view taken substantially on the line 9—9 of Fig. 5, illustrating the Geneva drive employed in conjunction with the movement of the negative film and sensitized film (or positive print) to and through the printing region of each unit.

Fig. 10 is a rear elevation of the Geneva film drive taken substantially on the line 10—10 of Fig. 4.

Fig. 14 is a sectional plan view partly broken away of a film printer unit embodying this invention, illustrating in particular the means provided for movement and centering of the aperture plate in relation to the impression on the negative film.

Fig. 15 is a plan view of the negative film illustrating the notch cut in the edge for causing the operation of the change of light strip.

Fig. 16 is a sectional side elevation of the contact mechanism and a diagrammatic view of the electrical connections operating in conjunction with the notch cut in the negative film.

Fig. 17 is a sectional view taken on the line 17—17 of Fig. 5, illustrating the friction drive employed in connection with the film take-up reel.

Fig. 18 is a fragmental view of the ratchet drive mechanism employed in this invention to drive the sprocket.

Fig. 19 is a front elevation of the contact mechanism employed in conjunction with the take up sprocket, with the cover removed.

Fig. 20 is a fragmental sectional side elevation taken on line 20—20 of Fig. 7, illustrating the Geneva actuating mechanism employed in conjunction with this invention for the movement of the light strip.

Fig. 21 is a sectional side elevation of the pressure or drag shoe employed for imparting tension to the sensitized film which is to be printed.

Fig. 22 is a sectional side elevation of a drag or pressure shoe for use in conjunction with the light change roller.

Fig. 23 is a sectional side elevation of the friction drive mechanism used in conjunction with the take-up reel.

Fig. 24 is a sectional side elevation of the lower end of the light tube or box illustrating the air connection thereto.

Figure 11:
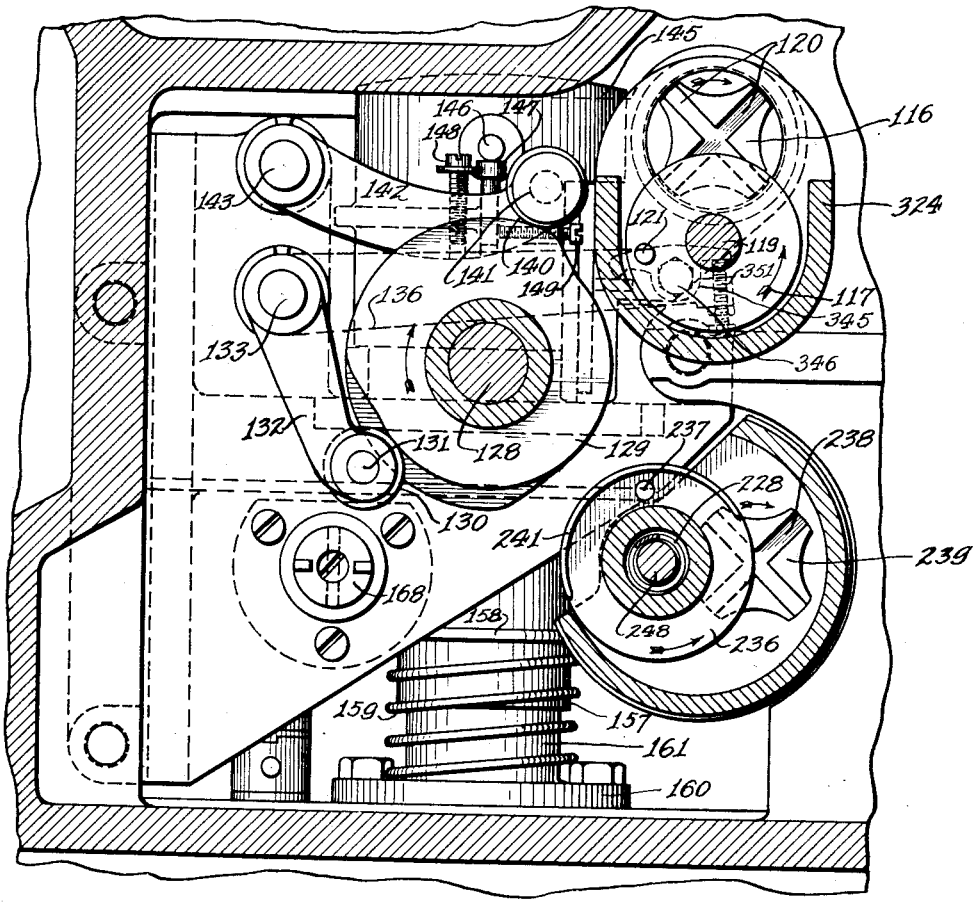
Fig. 11 is a rear sectional elevation taken substantially on the line 11—11 of Fig. 13, illustrating in particular the construction of a two-faced cam and the cam lever embodied in this invention for actuation of the pilot pins and the intermittent movement of the aperture plate.
Figure 12:
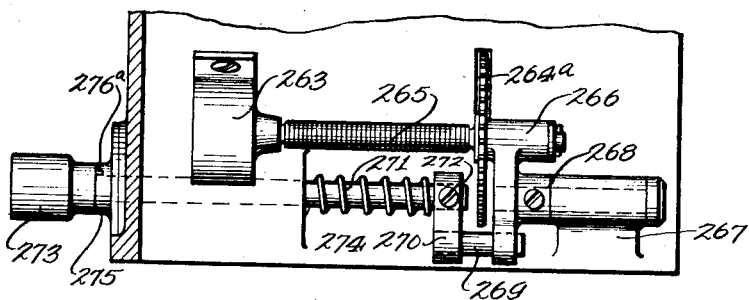
Fig. 12 is a side elevation of the counter connecting means employed in conjunction with this invention.
Figure 13:
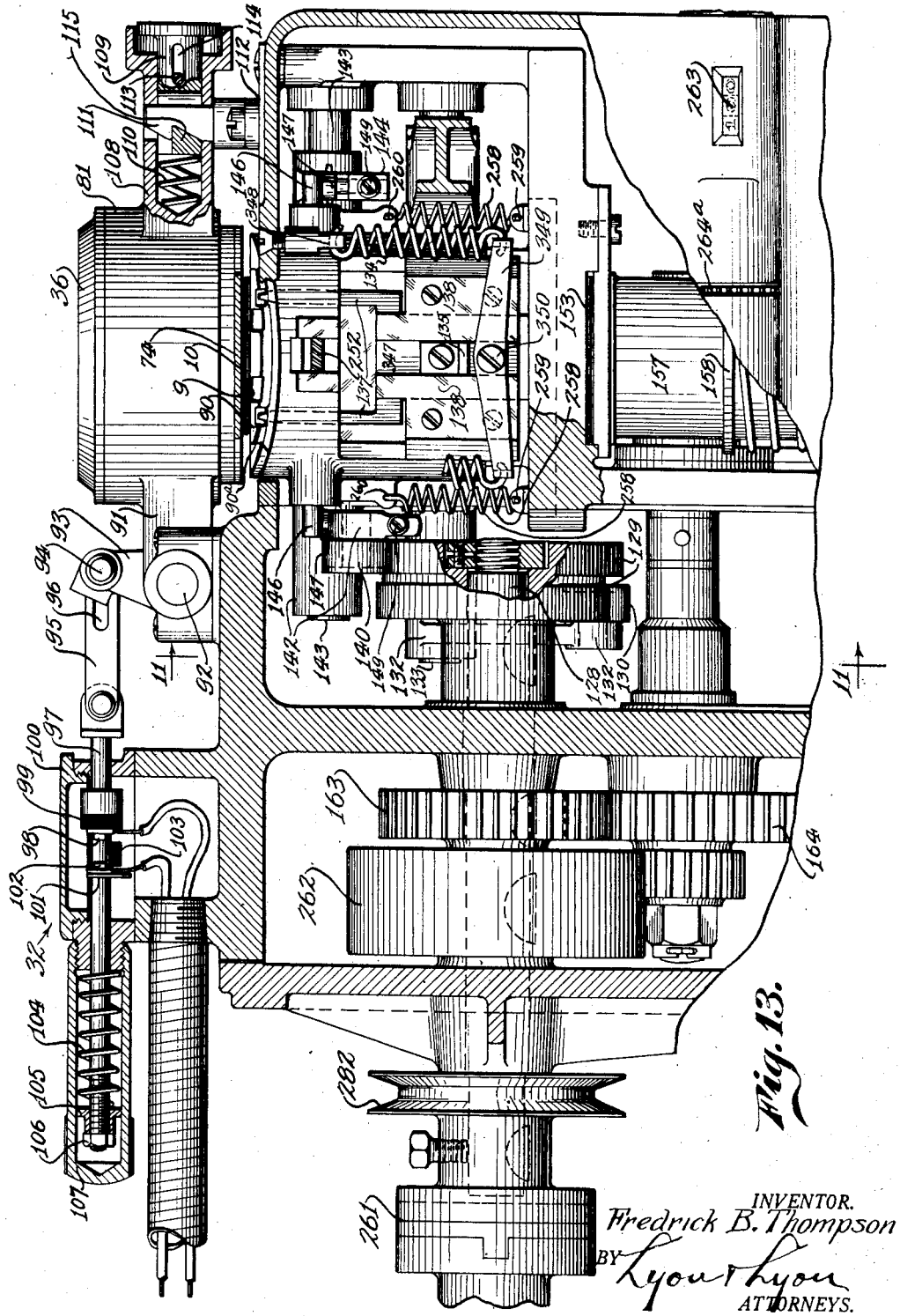
Fig. 13 is a section in elevation taken on the line 13—13 of Fig. 5.

The numeral 1 indicates a table which is supported as at 2. Positioned on the table at varying intervals are film printer units 3 which film printer units 3 are actuated through the medium of a countershaft 4, which countershaft 4 is driven from any suitable source of power as an electric motor 5 through a pulley and belt connection 6. Mounted on a suitable standard 7 is a negative stock reel 8 which may be adjusted as to heighth at 8 from the table 1. A negative film 9 passing from the stock reel 8 passes through each of the units 3 where the impressions or pictures thereon are printed on a sensitized film 10. The negative film 9 leaving the last unit 3 is wound on a suitable negative take-up reel 10$^a$, which negative take-up reel 10$^a$ is driven through a flexible connection 11 from the countershaft 4. The sensitized film 10 is taken from a suitable sensitized stock reel 12 mounted in an adjustable fashion on a standard 13. The sensitized film 10 passing through the film printer unit 3 leaves the same as the positive print and is wound on a suitable take-up reel 14 which take-up reel 14 is mounted on a standard 15 there being one stock reel 12 and take-up reel 14 for each unit of this assembled film printer gang.

16 illustrates an air storage tank which may be supplied with air pressure from any suitable source, not shown. A gage 17 is mounted on the tank 16 and indicates the pressure therein. In order to insure the correct pressure for contacting the negative film 9 with the sensitized film 10 a pressure reducing valve 18 is mounted in an air pressure line 19, which line 19 is connected through suitable connections 20 to each of the film units 3 for the purpose of contacting the films as will hereinafter be described. The take-up reels 14 are driven from the countershaft 4 through a coil spring belt 21. The use of this coil spring belt is to provide a slippage of the take-up reels 14 to compensate for the varying diameter of the roll of film. A light well is generally indicated at 22 and is adapted to pass through a hole cut in the table 1, the film printer units being secured to the table top in any suitable manner such as that indicated at 23. The power is transmitted from the countershaft 4 to the separate film printer units 3 by means of suitable beveled gears 24, it being understood that the countershaft 4 is held in position by any form of brackets 25 in which bracket the countershaft 4 rotates on suitable bearings.

Referring now particularly to Figure 3, 26 indicates a three-phase alternating current motor, the phases being connected as at 27 to a circuit breaker 28 which may be of the automatic remote control station type, the leads 29 being connected to any suitable source of power. In order to provide a safe mechanism so that there will be no danger of breaking the negative film or the positive film, a number of suitable safety devices are provided, among which are the switches indicated at 30, 31 and 32, which switches 30, 31 and 32 are provided for each film printing unit 3. In this diagram three such units are shown. A direct current generator 33 may be provided to supply the current requisite to the light or lights 34 positioned in each light well 22 which lights 34 may be of the ordinary incandescent bulb type. Also mounted in the light well 22 is a red light 35. The switch 30 is a manually operated switch operable to stop the printing at any time. The switch 31 is a means, termed by applicant "the tension switch" to be operated by the film tension when the said film tension exceeds a predetermined amount. The switch 32 is what applicant terms "a gate control switch" operable in conjunction with a gate 36 when it is desired to open the gate 36 to thread up a film printer unit 3. The switches 30, 31 and 32 are preferably connected in parallels and are connected to any two phases of the three-phased alternating current motor 26 so that when one switch is operated to make a contact an electromagnet 37 will be energized to draw a switch bar 38 to make a contact therewith by which contact the circuit breaker 28 is operated to break the circuit between the power lines 29 and the motor 26. The contact made by drawing the bar 38 toward the electromagnet 37 also acts to break the circuit to the white light 34 thereby shutting off the light provided for the printing region of each film printer unit 3 at the same time operating to connect the red lights 35 to give warning that there is trouble in the machine. Red lights are provided in the well box for this purpose because it is believed that the admission of red light in the light well 22 and hence into the printing region of a film printer 3 will not in any way act to cause the sensitized film 10 to be printed from the negative 9 or to be damaged in any way.

In Fig. 3 it will be noted that the electromagnet 37 is connected in series with the switches 30, 31 and 32. A catch 39 is provided in conjunction with the bar 38 so that when the bar 38 is drawn to the position for connecting the red light circuit it will be held in that position against the normal tendency of a spring 40. This catch is then manually operated to release the bar 38 so that the spring 40 may act to complete the circuit with the white lights 34. The negative film 9 from the positive stock reel 12 is trained over a feed sprocket 41. The positive or sensitized film 10 is trained over a positioning roller 42 before entering the feed sprocket 41 with the film 9. A roller 43 is provided to insure contact of the films 9 and 10 with the feed sprocket 41 so that there will be no danger of the films slipping on the feed sprocket 41 or damage due to imperfect contact with the said film sprocket.

The roller 43 is mounted on the end of a curved arm 44 to which curved arm 44 a finger trigger 45 is provided so that by gripping the trigger 45 the roller 43 may be raised from engagement with the films 9 and 10 so that the two films may be threaded on the feed sprocket 41. In order to hold this roller 43 away from engagement with the two films, a latch is provided and may consist of a trigger 46 adapted to engage a detent 47 in a flat spring 48, the said spring 48 being secured to the frame of the printer as at 49 and being retained in position to engage the trigger 46 by a pin 50. The pressure of the roller 43 against the films 9 and 10 is regulated through an adjustment 51 which consists of a screw 52 adapted to engage a boss 53' to rise or lower the roller 43 to or from the feed sprocket 41. A locknut 54 is provided to lock this adjustment in position. A pin 53 may be the shaft for the roller 42. In order to properly provide for the intermittent movement of the films 9 and 10, a loop 55 is maintained in the negative film 9 and a loop 56 is provided in the sensitized film 10 which loops are maintained by the following means:

The films 9 and 10 passing through the film printer unit 3 are trained over an intermittent sprocket 57 which sprocket 57 is intermittently controlled by a Geneva movement which will hereinafter be described, the intermittent sprocket 57 acting to impart tension to he films 9 and 10 to draw the same through the printer after the sensitized film 10 has been printed from the negative 9. A pressure shoe 58 is provided to act as a drag on the negative film 9 resisting the action of the sprocket 57 to pull the negative film 9 through the printer. Also a pressure shoe 59 is provided to impart a drag on the sensitized film 10. By this means in conjunction with a guide roller 60 over which the film 10 is trained and a stripper pin 61 adapted to engage the negative 9, and the two loops 55 and 56 are maintained in the two films.

The pressure shoe 59 is more fully illustrated in Fig. 21, the said pressure shoe 59 being secured to a screw 63 on which screw 63 a coil spring 64 is positioned, the spring 64 abutting the vertical extension 65 of the pressure shoe 59 and an inwardly extending circumferential shoulder 66 in a recess 67 which recess 67 is formed in the pressure gate 36. This pressure gate 36 is provided with a latch so that the same may be raised in threading the films into the printer, and the said pressure gate is positioned adjacent the pressure shoe, or shoes 59 to insure the negative film from turning or rolling at the edge, so as to maintain a uniform contact of the edge of the film with the light strip change roller 215.

The pressure shoe 58 for the negative film 9 is more fully illustrated in Fig. 22, the said pressure shoe 58 being secured to a gate 69 by means of a pair of screws 70. The gate 69 is pivotally secured to the frame of the film printer unit 3 as indicated at 71. A coil spring 72 is positioned between the shoe 58 and the block 69 as illustrated at 73.

In order to insure contact of the films 9 and 10 with the intermittent sprocket 57 a pressure member 74 is provided, which member 74 may be secured to the gate 36. Passing over the sprocket 57 the sensitized film 10, which is now a printed positive, together with the negative 9, passes over a take-up sprocket 75 which take-up sprocket 75 is mounted on the shaft 299 and driven by the gear 298 as will hereinafter be described. A pressure roller 76 having a pressure regulation device 77, similar in detail to that provided in conjunction with the pressure roller 43, is provided to maintain the films 9 and 10 in contact with the take-up sprocket 75. The film 10, leaving the sprocket 75, passes over a guide roller 78 to the take-up reel 14.

The negative film 9, leaving the sprocket 75, is trained over a tension roller 79, which tension roller 79 is adjustably connected to the switch 31 to actuate the switch 31 should the tension on the film 9 exceed a predetermined maximum, operating through a mechanism which will hereinafter be described. The film 9 leaving the tension roller 79 passes over a guide roller 80 to the next film printer unit 3.

The pressure gate 36 is of the following construction and mode of operation:

The gate 36 consists of an outer frame 81 through which a cap 82 is screw-threaded. Mounted in the cap 82 is a ruby glass 83 which ruby glass 83 is for the purpose of observing the progress of the films 9 and 10 during the printing operation without endangering the sensitized film 10 due to the admission of light to the printing room, the ruby glass 83 being held in position by a member 84. The outer wall 81 terminates at its lower end in an inwardly extending circumferential shoulder 85 upon which shoulder 85 a member 86 is seated and held in position by means of a light tension helical spring 87. Mounted in the member 86 is a glass 88 which glass 88 is at the lower end 89 concaved upwardly to conform to the curvature of an aperture plate 90. The purpose of this concaved grinding of the glass 88 and the aperture plate 90 is to insure a uniform contact of the negative film 9 with the positive or sensitized film 10 in this printing region as it is well known that two curved sheets of material will be more uniformly contacted by a pressure from below or above than two flat or horizontally traveling sheets. The outer portion 81 of the gate 36 has an extension 91 which extension 91 is pivoted to the frame of the film printer unit 3 as illustrated at 92. Secured to the extension 91 is a lever 93, in which lever 93 a shaft or pin 94 is mounted. An arm, 95 is secured to the pin 94 in a slot 96 in the said arm 95, the arm 95 being pivotally connected to an arm 97 to which arm 97 the electrical contact 98 is secured. Between the contact 98 and the arm 97 suitable insulation 99 is positioned. The arm 97 is adapted to pass through a hole in the casing 100 which casing 100 acts to enclose the switch 32, heretofore referred to.

Mounted in the casing 100 is a spring arm 101 to which spring 101 the contact 102 is secured, which contact 102 is insulated from the casing 100 as at 103. Mounted on the arm 97 is a helical spring 104 which abuts the casing 100 and a guide nut 105, the end of the arm 97 being threaded to receive a guide nut 105 and a locknut 106 so that the compression of the spring 104 may be regulated to overbalance the weight of the pressure gate 36. A screw cover 107 is provided for the spring 104. It is obvious that this switch 32 is not essential to the operation of this machine, but is provided to insure a safe operation thereof so that the pressure gate 36 being raised, a contact will be made between the members 98 and 102, thereby operating the switch 32 to shut off the motor 26 and the light 34, so that the sensitized film 10 will not be damaged should such a raising of the pressure gate 36 take place, as heretofore described the red light 35 will be turned on when this light 34 is shut off.

A latch is provided in conjunction with the pressure plate 36, of the following construction:

108 illustrates a cylindrical extension of the outer portion 81 of the gate 36. Mounted therein is a button or rod 109. A helical spring 110 is positioned between the rod 109 and the lower end of the cylindrical member 108 and normally tends to push the rod 109 outward. A catch 111 is secured to the frame as at 112, and extends into the cylindrical member 108 and through a recessed portion of the pin 109. A pin 113 is mounted in the cylindrical member 108 and rides in a slot 114 in the pin 109. It will be obvious that by pushing on the end of the pin 109 the extension 115 of the pin 109 will be released from the catch 111 and the spring 104 will tend to operate through the connections heretofore described to raise the pressure gate 36 at the same time actuating the switch 32 to stop the printing operation. The gate 36 may then be swung back to get at the films 9 and 10 either during the threading of the films through the machines or in case trouble develops while operating.

The intermittent operation of the feed sprocket 57 to drag the films 9 and 10 is controlled by the following mechanism:

The sprocket 57 is driven from the Geneva wheel 116 which Geneva wheel 116 is driven from a Geneva pinwheel 117 mounted on and keyed to the shaft 119, driven by a gear 118. The recesses 120 in the Geneva wheel 116 engages a pin 121 of the Geneva pinwheel 117, which engagement of the pin 121 with the recess 120 operates to rotate the sprocket 57 one-quarter of a revolution, which rotation of the sprocket causes the films 9 and 10 to move the single picture which has been printed from the negative 9 to the positive 10 from the zone of printing activity and bring another single picture into the zone of the printing operation.

The sprocket 57 is preferably driven through operation of the Geneva wheel 116 which is secured to the shaft 122 in any suitable manner and is driven in the bearings 123 which bearings 123 may be oiled through a suitable hole 124. The sprocket wheel 57 is riveted to a cylindrical plate or washer 125 through which plate 125 the squared extension 126 of the shaft 122 passes. A nut 127 is screw-threaded to the shaft 122 so as to maintain the sprocket 57 or the washer 125 in engagement with the squared extension 126 of the shaft 122. In order to insure the centering of the negative 9 with the sensitized film 10 in the printing zone or position, I prefer to employ the following mechanism:

Mounted on the main drive shaft 128 is a double faced cam wheel 129. A cam roller 130 is adapted to ride on one of the surfaces of this cam wheel 129. The said roller 130 is loosely journaled on a pin 131, which pin 131 is secured to a pilot pin cam lever 132.

The lever 132 is connected to one end of a rocker shaft 133 to which rocker shaft 133 an arm 136 is secured, to which arm 136 the lever 345 is pivoted as at 346. The end or point of the lever 345 bears upon a bracket 135 secured to the pilot pin base 347. Helical tension springs 134 are adjustably attached at one end to the frame as at 348 and are attached at the other end to a yoke 349, which yoke 349 is pivotally secured to the pilot pin base 347 as indicated at 350.

The helical tension springs 134 act to force the pilot pins 137 upwardly through the perforations 9ª in the sides of the films 9 and 10 which action results in the pilot pins centering the impressions or pictures of the film 9 in relation to the aperture in the aperture plate 90, as well as centering the films 9 and 10 in relation to the perforations 9ª. Therefore it will be apparent that the springs are causing the pilot pins to move upward into the region of travel of the films 9 and 10 so that if the springs so fail to operate or break the pilot pins will not be moved upward, as the pilot pins are positively moved downward through the action of the cam wheel 129 acting through the roller 130, pin 131, lever 132, rocker shaft 133, arm 136 and pivoted contact lever 345, to force the bracket 135 downward and hence withdraw the pilot pins 137 from the perforations 9ª.

The height or position of the pilot pins 137 may be adjusted by means of the screw 351 through the lever 345. When the pilot pins 137 have been moved downwardly from the perforations 9ª the films 9 and 10 are moved forward by the Geneva movement heretofore described. The springs 134 it will be seen are acting to hold the roller 130 against the surface of the cam 129. The pilot pin base 347 slides within guides 138 and the pilot pins 137 pass through perforations 139 in the outside tube 145 and slots 90ª in the aperture plate 90. A roller 140 is adapted to ride on the other face of the double faced cam 129, the said roller 140 being loosely journaled on a pin 141 which pin 141 is secured to a lever 142, attached to a rocker shaft 143 which is secured to a lever 144, which levers 142 and 144 act upon what applicant terms the "outside tube" 145 for raising or lowering the aperture plate 90 secured thereto to impart pressure to the films 9 and 10 to insure contact thereof during the printing of the positive film or print from the negative film.

It is important to this printing operation that the contact made between the aperture plate 90 and the glass 88 be relieved after the printing of the positive print from the negative has taken place so that the intermittent sprocket wheel 57 may operate to change the position of the films 9 without a drag on the films 9 and 10 to position another picture over the aperture in the aperture plate 90. For this purpose the following means are provided:

The springs 258 are secured to the frame as at 259 and to the outside tube as at 260, and operate to return the outside tube after the said outside tube has been raised for the contacting of the films 9 and 10, as heretofore described. The said springs 258 likewise acting through levers 142 and 144 to insure contact of the roller 140 with the face of the cam 129.

The pressure to be imparted by the outside tube 145 to the pressure plate 90 may be adjusted by means of the following adjustment:

A pin 146, resting on a pin 147, which pin 147 may be raised or lowered by the turning of a screw 148 and which pin 147 may be locked in the adjusted position by means of a lock or set screw 149 which operation results in an adjustment of the aperture plate 90 on the outside tube 145, which adjustment is provided in connection with both levers 142 and 144 to insure a uniform distribution of pressure of the aperture plate 90 against the films 9 and 10 as shown in Fig. 14.

The admission of light from the light well 22 is admitted to the interior of the inner tube 150 and hence through the aperture plate 90 to the printing region by the following means:

Secured to the lower end of the inner tube 150 is a glass retaining rim 151, in which glass retaining rim a piece of ground glass 152 is fitted. The purpose of this ground glass is to diffuse light into the inner tube 150 so that there will be no direct glare of light against the negative 9. Passing directly under this ground glass is a light strip 153 which has a number of perforations 154 cut therein, the sizes of these apertures or orifices being previously cut to admit the proper light to the scene being printed as hereinbefore set forth. The light strip 153 is constructed similarly to the films 9 and 10, having perforations 155 in the edges thereof. The perforations 154 are formed longitudinally of the light strip with their centers spaced equal distances apart as will be apparent from Figure 8. However, any form of construction of this light strip could be made to operate in this machine by changing the mechanism of controlling its operation, the light strip being constructed similar to the film only for a matter of simplicity in carrying the strip through the machine. The light strip 153 is pressed against the lower portion of the frame at 156 by means of a pressure sleeve 157 so that a tension will be imparted therein to insure the proper positioning of the orifice 154 to admit light to the printing zone. The sleeve 157 has an outwardly extending shoulder 158 against which a coil spring 159 is abutted, the said coil spring resting at its opposite end against the plate 160, which plate 160 may be a horizontal extension of the inner tube 161. As indicated in Figure 5 the inside of the inner tube 161 may be serrated as at 352 or the inside of the tube 161 may be covered with felt or other similar material to avoid the danger of light being reflected into the printing region.

Mounted below the tube 161 is a shutter 162 which shutter is for the purpose of cutting off the light admitted to the printing zone during the movement of the films 9 and 10 to change the picture to be printed. The shutter is operated by the following means:

Driven from a gear 163 mounted on the main drive shaft 128 is a shutter drive gear 165 which drives the shaft 166 connected to a shutter drive shaft 167 by means of an Oldham coupling 168 which coupling is employed for ease in setting up the machine or for the purpose of making repairs in the machine after set up. Mounted on a shaft 167 is a spiral gear 169 which spiral gear 169 meshes with the spiral gear 170 which operates to rotate the shutter shaft 171 to which shutter shaft 171 the shutter 162 is secured by any suitable means as illustrated at 172. The shutter as illustrated in Figure 7 is a circular disc having an arcuate slot 173 therein for the admission of light to the printing zone from the light well 22.

It will be obvious that as the shutter is rotated the opening 173 passes over the lower end 174 of a light passage 175 to admit the light from the light well 22 to the light tube 175 at intervals which are determined by the size of the radial slot 173 and the speed of rotation of the shutter 172 so that by this means light is admitted to the printing zone only at predetermined intervals. The light well 22 comprises an outer casing 176 connected to the main frame of a film printer unit 3 as at 177 so as to make a light-proof connection at this point. Mounted on the casing 176 and connected and operated as heretofore fully described, is the red light 35. The white light 34 is mounted in a socket 178 which socket is mounted in a plate 179, which is clamped to a traveling block 180 by means of a tubular hand nut 164, which hand nut 164 provides means for centering the lamp 34 in relation to the light passage 175, the socket 178 being connected to the direct current generator 33 by or through a suitable connection 181. The traveling block 180 has vertical extensions 182 on one side thereof which are adapted to slide on guide rods 183 which guide rods 183 are secured in position to the main frame of the film unit 3 by any suitable means. A vertical extension 184 of the traveling block 180 is screw-threaded to receive a shaft 185 which shaft 185 is loosely journaled in a bearing at its lower end (not shown). The upper end of the shaft 185 passes through a guide bracket 186 which guide bracket likewise acts as a lock for holding the shaft 185 in position which locking means in the bracket 186 comprises bushings 187 which bushings 187 are screw-threaded to receive an adjustment lock screw 188 to force the bushing 187 against the shaft 185 to hold the same against rotation.

Keyed to a reduced portion 189 of the shaft 185 is a beveled gear 190, which beveled gear 190 is held in position by a nut 191. The beveled gear 190 meshes with a beveled gear 192 which is keyed to a shaft 193 as illustrated at 194.

Secured to the opposite end of the shaft 193 by a key 195 is an adjustment handle or knob 196 which knob 196 is constructed so as to form, in addition to a knob, a dial 197 which dial 197 is graduated so that the positions or position of the lamp 34 in the light well 22 may be read therefrom. A plate 198 is securely held above the lamp 34 by means of rods 199. The plate 198 has a central slot or orifice 200 cut or punched therein, the purpose of this plate 198 and slot or orifice 200 being to cut all but the central light from the lamp 34 so that the direct measured quantity of light will pass through the orifices 200. As heretofore referred to, the amount of light admitted to the printing region is controlled by means of the light strip 153 which is operated by the following means:

The light strip 153 passing under the ground glass 152 is held in position by means of the pressure sleeve 157, and is trained over the intermittently operated light strip sprocket 201. A guide gate 202 is secured to an arm 203 and operates to hold the light strip on the sprocket 201 so that the sprocket 201 will positively act to control the movement of the light strip 153, the pressure gate 202 may be rotated by means of a knob 202ª so that the same may swing back from the sprocket wheel 201 when it is desired to thread the light strip 153 over said sprocket or to make other adjustments in the operation or movement of the light strip 153. The light strip sprocket 201 is driven from a shaft 204 through the medium of a tooth clutch 205 which tooth clutch 205 consists of a plate 206 which plate 206 is riveted to the sprocket 201 as illustrated at 207. The plate 206 has an extension 208 which has teeth 209, which teeth 209 are adapted to engage teeth 210 on the handle 211 which handle 211 is adapted to fit over a squared nut 212 on the shaft 204 so that as the shaft 204 is rotated the sprocket wheel 201 will be rotated. However, by pulling outward on the handle 211 against the pressure of the spring 213, the teeth 209 and 210 will be released from engagement and the sprocket wheel 201 will be free to revolve on the shaft 204 so that the light strip may be threaded over said sprocket or pulled through the sprocket to position the proper orifice 154 under the ground glass 152. The rotation of the shaft 204 and hence the sprocket 201, is controlled through the following mechanism:

When it is desired to change the orifice 154 to operate to admit light to the printing zone there is positioned or cut on the negative film 9 at a predetermined distance from the point where such a light change is desired, a notch or recess 214 which notch 214 will receive a roller 215, which normally rotates against the edge of the negative film 9. The roller 215 is journaled on a lever 216 which operates through the medium of a spring 217 to hold the roller 215 in engagement with the edge of the negative film 9 and, as illustrated in Figure 16, when the roller 215 engages the notch 214, the lever 216 is pulled by the spring 217 to cause the contact 218 to meet a contact 220, which contacts 218 and 220 are insulated from the lever 216 and a contact-case 221 respectively, as at 222 and 223.

This contact operates to complete the circuit 224 and to energize a solenoid 225, which operates to pull the lever or rod 226 down, the downward motion of the rod 226 being limited by stops 246 as hereinafter described. The rod 226 is secured to one lever 229 of a bell crank 230 through the medium of a link 231. The rod 226 being pulled down by the solenoid 225 therefore rotates the bell crank 230 on a pin 232 against the tension of a spring 233. A pin 234 is secured to the long arm of the bell crank 230 and on desired motion of the long arm of the bell crank 230 enters a cam slot 235 which cam slot 235 is cut in a pinwheel 236 on the Geneva control mechanism for operation of the intermittent sprocket 201 moving the pinwheel 236 forward so that a pin 237 is forced against the action of the spring 228 to enter one of the slots 238 of a Geneva wheel 239 thereby rotating the Geneva wheel 239 one-quarter of a revolution, which rotation of the Geneva wheel 239 acts to rotate the shaft 204 and subsequently the sprocket wheel 201 by which rotation of the sprocket wheel 201 the light strip 153 is moved forward a predetermined distance thereby changing the orifice 154 acting to admit light to the printing zone of the film printer 3. Connected across the circuit 224 is a switch 240 which switch is manually operated for a quick changing of the light strip with each separate picture printed to provide for what is known as fading in and out the light admitted to the printing zone of the film printer unit 3 to produce what is known in the art as a fade out or fade in, as the case may be. As the negative film 9 is only in the printing position for approximately one-tenth of a second, it is necessary to provide a very quick acting solenoid 225 in order to prevent any movement of the light strip 153 while the negative film is moving into position and hence while the roller 215 is entering the notch 54.

In order to insure a correct timing of the operation of the light strip sprocket 201, a lip 241 is provided on the pinwheel 236 and the long arm of the bell crank 230 is prevented from moving downward by the pin 242 until the pinwheel 236 has rotated to a proper position and the pin 242 has passed through the lip 241. The lip 241 operates in conjunction with the pin 242 to hold the bell crank 230 in position when the roller 215 leaves the notch 214 and the contact is broken and the solenoid ceases to operate to pull downwardly on the rod 226. The cam slot 235 is so formed that it tends to return the lever 230 to the nonoperative position. The pin 232 on which the bell crank 230 rotates is screw threaded into the main casing bracket 243. Likewise secured to the main casing 243 is a plate 244, which plate 244 has threaded portions 245 for receiving bolts 246. The bolts 246 act as stops to limit the motion of the bell crank lever 230, said bolts 246 having lock nuts 247 for securing these bolts in their proper adjustment.

It is of course understood that the pinwheel 236 is rotated at all times when the machine is in operation and the pinwheel 236 is feather-keyed to a shaft 248, on which shaft 248 a gear 249 is secured which gear 249 is driven from the gear 163 on the cam shaft 128.

Figure 7 illustrates the cam slot 235 and the manner of operation thereof to position or lower the pinwheel 236 so that the pin 237 will engage one of the recesses 238 in the geneva wheel 239.

A spiral gear 250 is keyed to a shaft 251, which shaft 251 is rotated by the hand knob 257 for adjustment of the aperture plate 90 relative to the pilot pins 137. The gear 250 meshes with the spiral gear 252 which spiral gear is slidably mounted on a squared shaft 253 which carries an eccentric 254 which fits in a slot 255 in the aperture plate 90 and operates to move the aperture plate longitudinally in relation to the film. This movement of the aperture plate longitudinally of the film adjusts the aperture plate 90 in relation to the pilot pins 137 for a film on which the exposure or picture is incorrectly centered in regard to the perforations 9ª.

A recess 256 is cut in the aperture plate 90 for printing code numbers on the positive print 10 from the negative 9.

The main drive shaft 128 is connected to the countershaft 4 by means of a suitable coupling such as that illustrated at 261. Mounted on the driveshaft 128 is a flywheel 262 which flywheel 262 may be for the purpose of maintaining a smooth operation of the mechanism of the film printer units 3.

Mounted in connection with the light strip sprocket 201, heretofore described, is a counter 263 which counter may be for the purpose of counting the number of light changes during the printing of the positive film from the negative. This counter is driven by means of the gears 264, 264ª, which gear 264 is mounted on the sprocket shaft 204 and which gear 264ª is mounted on a flexible shaft 265. Means are provided for disconnecting the counter which means may be substantially as follows:

The gear 264ª is likewise loosely journaled on an arm 266 which arm 266 is pivotally supported in a bracket 267 as illustrated at 268, the arm 266 extending beyond the bracket 267 is connected to a crank pin 269 which crank pin 269 is connected at its opposite end to an arm 270 which arm 270 is secured to a rod 271 by any suitable means as illustrated at 272. The rod 271 extends outward through the frame of the film printer unit 3 and has a knob 273 secured thereto. Positioned on the rod 271, between the bar or arm 270 and the frame of the film printer, is a helical spring 274 which spring 274 normally tends to hold the knob 273 in engagement with a collar 275. Recesses 276 and 276ª, adapted to receive a pin 277 which pin 277 may be an extension of the knob 273, are cut in the collar 275 so that when the pin 277 is in the recess 276 the gear 264 will mesh with the gear 263 and the counter will operate. However, when the knob 273 is pulled outward against the compression of the spring 274 and turned, the extension 277 will enter the recess 276ª in the collar 275 and the gear 264 will fail to mesh with the gear 263 and the counter will fail to operate. This means of disconnecting the counter is provided for when threading light strips 153 through the machine.

Figure 24 illustrates the manner in which air is admitted to the printing zone to hold the films 9 and 10 in contact. An air duct 278 is drilled or otherwise cut in the portion of the frame 279 and a vertical hole 280 is cut in the light tube 150 to communicate with the air duct 278. The air duct 278 is connected by means of the coupling 281 to a source of air supply such as the air storage tank 16, heretofore referred to. By supplying air continuously through the aperture in the aperture plate 90, contact is assured between the films 9 and 10 and when the aperture plate recedes from engagement with the glass 88 the air will exhaust through the space between the film 9 and the said aperture. However, when the aperture plate is again raised, it being assured that there will be an air pressure sufficient to obtain the desired contact between the films 9 and 10 so that the printing will properly take place, the positive take-up reel 14, driven through the flexible spring connection 21 which flexible spring connection 21 is driven by a take-up reel pulley 282, is mounted on the main drive shaft 128 of the film printer unit 3.

It is considered advisable to have the negative take-up reel operated through a friction drive which friction drive is illustrated in Figure 23.

The flexible spring connection 21 runs over the driven pulley 283 loosely journaled on a shaft 284. Keyed to the shaft 284 is a member 286 which is adapted to receive a washer 287 of felt or similar material. The pulley 283 is recessed as at 288 to receive the coil spring 289 which coil spring abuts a member 290 secured to the end of the shaft 284 so that the pressure exerted by the spring 289 acts to force the pulley 283 against the felt washer 287 by which contact the pulley 283 is driven by the member 286.

In order to secure the member 290 to the shaft the member 290 may be constructed similarly to a split nut and clamped together with a screw as illustrated at 291. The take-up reel 14 is keyed to the shaft 284 which shaft 284 is journaled in a standard 15.

Figure 18 illustrates the manner in which the feed sprocket 41 is driven or is connected to the shaft 341, which shaft is driven by a gear 342, which gear 342 is driven through a pair of idler gears 343 from a pinion 344 mounted on the shutter drive shaft 166. To the sprocket 41 is riveted the plate 292, which plate 292 has teeth 293, the shaft 341 having a squared portion 294 which is adapted to receive the squared collar 295 which is slidably mounted on the portion 294. The collar 295 is toothed so as to engage the teeth 293 of the plate 292. Mounted on the collar 295 and abutting a collar 296 is a coil spring 297 which coil spring tends to force the collar 295 outward so that the teeth of the collar will engage the teeth 293. With this construction it will be obvious that the sprocket 41 may be revolved forward in the threading of the films 9 and 10 but that the same is positively driven forward by the gear 342 heretofore referred to.

The take-up sprocket 75 is friction driven as illustrated in Figure 17 of the drawing, being driven from the take-up sprocket gear 298 which is driven from a gear mounted on the film Geneva shaft heretofore referred to, as will be seen in Figure 6. The gear 298 is keyed to the shaft 299 which is journaled in suitable bearings 300. The shaft 299 is squared as at 301 and is adapted to receive a member 302, which has a squared hole therein conforming to the squared portion 301 and slidably journaled on the squared portion 301. A coil spring 303 is positioned on the member 302 and abuts a collar 304, mounted on the shaft 299 and positioned against the outer frame of the film printer 3. The sprocket 75 is loosely journaled on a cylindrical extension 305 of the shaft 299 and is held in position thereon by any suitable means as indicated at 306.

It will be obvious that the pressure of the spring exerted against the member 302 will force the member 302 to engage the sprocket 75 and thereby cause the sprocket 75 to rotate. The tension roller 79 is connected to and made to operate the switch 31 by the following means:

The roller 79 is loosely journaled on a pin 307 which pin 307 is secured to an arm 308. The arm 308 is pivotally secured to the frame as illustrated at 309. Pivotally connected intermediate the ends of the lever 308 are links 310 which links 310 are pivotally connected to a rod 311. Attached to the rod 311 is a bracket 312 which bracket 312 holds an electrical contact 313. A contact 314 is connected to the case 315 by any suitable means as illustrated at 316.

It will be apparent that as the tension increases in the negative film 10, and the roller 79 is raised, the contact 313 will meet the contact 314 and operate the switch 31 as heretofore fully explained to stop the film printer unit 3. An adjustment is provided for varying the tension required in the negative film 9 to operate this switch 31. This adjustment consists in the rod 311 being threaded as at 317 to receive the nut 318. Mounted on the rod between the threaded extension 319 of the casing 315, is a helical spring 320 which spring acts to hold the contact 313 away from the contact 314 and by adjusting the position of the nut 318 on the rod 311 the distance between the contacts 313 and the tension required to connect these two contacts may be regulated. A cylindrical cover 321 is adapted to be screw-threaded to the extension 319 to cover the spring and within which the nut 318 is adapted to slide.

An adjustment is provided for the intermittent sprocket 57 moving the said sprocket to or from the pilot pins 137 to compensate for the shrinkage in the negative film 9 and to especially compensate for the large shrinkage found in old negatives that are to be printed on this machine. Also this adjustment enables an easy setting up of the machine. The intermittent sprocket 57 is driven through the Geneva drive heretofore fully explained from the shaft 119, which shaft 119 is driven by the film Geneva gear 118 which gear is driven from a cam shaft drive gear 163, which cam shaft gear 163 is mounted on the main drive wheel shaft 128. The Geneva housing 324 is screwed to the film printer frame by means of the screws 325, the screws 325 passing through the arcuate slots 326 in the Geneva housing 324. An ear 327 is made integral with the Geneva housing 324 and is pivotally connected to a threaded rod 328 which rod 328 is screw-threaded to the cylindrical collar member 329, which cylindrical collar member is adapted to pass through a hole 330 in the frame, the extension 331 of the collar abutting the frame as at 332.

It will be obvious that by turning the collar 329 the position of the shaft 122 will be varied as will likewise be the position of the sprocket 57 either to or from the pilot pins 137 to adjust for the various length of the negative film 9. A cylindrical member 333 is provided to pass over the end of the collar 329 and has a central hole therein through which the end of the collar 329 passes, which cylindrical member engages the extension 331 of the collar 329 and by means of the screws 334 the member 333 is caused to press against the collar 329 to hold the said collar in position when an adjustment has been made.

In order to relieve the pressure of the sleeve 157 against the lower portion of the frame so that the light strip may be threaded through the machine, there is provided a cam member 335 adapted to engage the sleeve 157 to push the said sleeve downward when the said cam member is rotated. The cam member 335 is secured to a pin 336 which pin extends outward from the frame and is secured to a handle or knob 337 which handle 337 may be turned to turn the said cam 335 and lower the sleeve 157. A torsion spring 338 is mounted on the pin 336 having one end secured thereto as at 339 and the other end secured to the frame as at 340 which spring will tend to resist the turning of the handle 337 to lower the sleeve 157.

It is to be understood that many refinements found in the design of this film printer, and illustrated in the drawings, have been omitted for the sake of clarity of this specification, which omissions consist primarily of the design of the outside frame, the sectional frame found therein, removable covers for the gear casing, the bearings in which the majority of the shafts rotate, oiling arrangements indicated in the drawings and other similar refinements.

The operation of this novel film printer is as follows:

The negative film 9 is threaded together with the sensitized film 10 through the first film printer unit 3 first passing over the feed sprocket 41 and being caused to travel through the machine by the intermittently operated sprocket 57. Reviewing the sprocket 57, the films 9 and 10 pass over the take-up sprocket 75 from which sprocket 75 the film 10, trained over suitable idlers, is wound on the take-up reel 14 and the negative film 9 passing over the tension roller 79 and the idler 80 passes to the next film printer unit 3 where the same operation as described is performed. As the films 9 and 10 come to rest over the aperture plate 90 they are centered by means of the pilot pins 137 and the pressure sleeve or outer tube operates to contact the films 9 and 10 with the pressure glass 88. The shutter 162 is then opened and light is admitted from the light well 22 through the proper orifice 154 in the light strip 153, air being admitted continuously through the air duct 279 to hold the films 9 and 10 in contact during the printing operation.

At the conclusion of one cycle of printing operation, the Geneva drive mechanism, operating in connection with the sprocket 57 operates as heretofore described to rotate the sprocket 57 and move the films 9 and 10 to position another picture over the aperture in the aperture plate 90 on which action the operation as above described is repeated. When a change of scene requiring a change of light for the development of the positive film from the negative 9 approaches the printing region, and just before that change of light is required, the roller 215 engages the notch 214 and the requisite contact is made to cause the sprocket 201 to rotate to advance the light strip 153 to position the proper orifice under the ground glass 152 as heretofore fully described. The movement of the light strip 153 having taken place while the shutter 152 was closed so that an exact regulation of the admission of light to the printing zone is obtained, it being understood that the position of the lamp 35 was regulated by turning the knob or handle 196 before the film was threaded through the machine if necessary by the use of a photometer placed over the orifice in the aperture plate 90 after the gate 36 has been swung back as heretofore described.

Having fully described a preferred embodiment of this invention and a brief review of the operation thereof, it is to be understood that I do not wish to be limited to the exact details of construction hereinbefore disclosed but my invention is for the scope of the appended claims.

I claim:

1. In a photographic film printer unit, the combination of means for intermittently contacting a negative film with a sensitized film at a point of exposure, said means comprising a pressure tube, a convex aperture plate secured to the said tube, a concave pressure gate and means for causing an intermittent vertical motion of the pressure tube, and means for intermittently admitting light to the point of exposure.

2. In a photographic film printer unit, the combination of means for intermittently contacting a negative film with a sensitized film at the point of exposure, said means comprising a pressure tube, an aperture plate secured to said tube, means for effecting horizontal adjustment of the aperture plate, a pressure gate and means adapted for effecting an intermittent vertical motion of the said pressure tube.

3. In a photographic film printer unit, the combination of means for intermittently contacting a negative film with a sensitized film at a point of exposure, a source of illumination, a light directing tube, a light strip interposed between said light tube and said point of exposure and a plurality of orifices in said light strip, the orifices being of variant predetermined sizes, and means for moving said light strip.

4. In a photographic film printer unit, the combination of means for intermittently contacting a negative film with a sensitized film at a point of exposure, a source of illumination, a light directing tube between said source and point of exposure, a light strip having an unrestricted orifice of definite diameter between the source of illumination and the said light tube, and means for moving the light strip to position a second unrestricted orifice of different diameter between the said source of illumination and said light tube.

5. In a photographic film printer unit, the combination of means for intermittently contacting a negative film with a sensitized film at a point of exposure, a source of illumination, a light directing tube, a rotary shutter mounted between the said source of illumination and the point of exposure, a light strip between the rotary shutter and the point of exposure, said light strip having a plurality of unrestricted orifices of variant predetermined diameters, and means for actuating the light strip.

6. In a photographic film printer unit, the combination of means for causing an intermittent travel of a negative film and a sensitized film to a point of exposure, means for contacting the negative film with the sensitized film at the point of exposure, a source of illumination, a light directing tube between said source and the point of exposure, and a light strip interposed between said light tube and said point of exposure the said light strip having a plurality of spaced unrestricted orifices of variant predetermined sizes, and means for actuating the light strip.

7. In a photographic film printer unit, the combination of means for effecting intermittent travel of a negative film and a sensitized film, means for contacting the negative film with the sensitized film at the point of exposure, a source of illumination, a light directing tube between said source and the point of exposure, a light strip interposed between said directioning tube and said point of exposure, a plurality of unrestricted orifices of variant predetermined sizes in said light strip and means operable in conjunction with the travel of the negative film for effecting the travel of the light strip.

8. In a photographic film printer unit, the combination of means for intermittently contacting a negative film with a sensitized film at a point of exposure, a light well, an incandescent lamp bulb mounted in said well, means for adjusting the vertical position of the said bulb, a light directing tube between the well and the point of exposure, and a light strip interposed between said light tube and said point of exposure, said light strip having a plurality of unrestricted orifices of variant predetermined sizes cut therein, and means for actuating the light strip.

9. In a photographic film printer unit, the combination of means for intermittently drawing a negative film and a sensitized film to a point of exposure, means for contacting the films at a point of exposure during the stationary period of the said films, a source of illumination, means for directing the light from the source to the point of exposure, means for admitting light to the point of exposure while the films are contacting, a light strip between said source and the point of exposure, a plurality of unrestricted orifices of variant diameters cut in the said light strip, one of said orifices being positioned for allowing a definite light intensity to flow from the said source to the point of exposure and means operable during the travel of the said films for automatically causing a travel of the light strip to change the orifice admitting light to the point of exposure.

10. A photographic film printer unit comprising means for contacting a negative film with a sensitized film at the point of exposure, means intermittently admitting light to the point of exposure, means comprising a light strip having a plurality of unrestricted orifices of variant diameters therein, and means for causing an intermittent travel of the light strip to change the orifice admitting light to the point of exposure.

11. In an apparatus of the character described, the combination of a plurality of printing units, means for causing intermittent horizontal travel of a negative film through the units, means for causing intermittent horizontal travel of a sensitized film through each printing unit, and means for contacting the negative film with a sensitized film at a point of exposure.

12. In an apparatus of the character described, the combination of a plurality of printing units, means for causing intermittent horizontal travel of a negative film through the units, means for causing intermittent horizontal travel of a sensitized film through each printing unit, a point of exposure in each unit, means for contacting the negative films with the sensitized films in each unit during the period of rest, and means for intermittently admitting light to the point of exposure in each unit.

13. In an apparatus of the character described, the combination of a plurality of printer units, means for causing a horizontal intermittent travel of a negative film through the said units, means for causing horizontal intermittent travel of a sensitized film through each unit, means for contacting the negative film and the sensitized film during the stationary period, means for admitting light of definite intensity to a point of exposure of each unit, and means operable during the travel of the said films for changing the light intensities to be admitted to the points of exposure of the said units.

14. In an apparatus of the class described, the combination of a plurality of printer units, means for causing horizontal travel of a negative film through the said units, means for causing horizontal travel of a sensitized film through each unit, a source of illumination, means for admitting light in definite intensities from the source of illumination to a point of exposure of each unit, said means comprising a light strip having a plurality of orifices cut therein.

15. In an apparatus of the character described, the combination of a plurality of printer units, means for causing a horizontal intermittent travel of a negative film through the said units, means for causing horizontal intermittent travel of a sensitized film through each unit, a source of illumination, means for directioning the light from the source to a point of exposure of each unit and means operable in conjunction with the travel of the negative film for varying the light intensity admitted to the point of exposure of each unit.

16. In a photographic film printer unit, the combination of means for causing an intermittent travel of a negative film and a sensitized film to a point of exposure, means for contacting the said films during the stop thereof, said latter means comprising a pressure tube and a convex upward apertured plate secured to the said tube, a pressure gate, a concave downward glass yieldingly secured in the said pressure gate and means operable for intermittently raising and lowering the pressure tube for contacting the negative film with a sensitized film in a curved relation.

17. In a film printer unit, the combination of means for causing an intermittent travel of a negative film and a sensitized film to a point of exposure, means for contacting the films during the stop thereof, said latter means comprising a pressure tube, a curved aperture plate secured to the said tube, a hinged pressure gate having an oppositely curved member secured therein, means for latching the pressure gate closed, and means operating when the said latch is released for arresting the travel of the said films.

18. In a photographic film printer unit, the combination of means for causing an intermittent travel of a negative film and a sensitized film to a point of exposure, means for contacting the films in a curved relation during the stop thereof, said latter means comprising a curved aperture plate, a curved pressure plate, means for intermittently raising and lowering the said aperture plate, and means for admitting air to the contacted films through the said aperture plate.

19. In a photographic film printer, the combination of means for intermittently contacting a negative film with a sensitized film at a point of exposure, a source of illumination, a light directing tube interposed between the source of illumination and the point of exposure, a light strip having a plurality of orifices of variant predetermined diameters interposed in the light tube between the said source of illumination and the point of exposure, and means for actuating the light strip to change the orifice admitting light to the point of exposure.

20. In a photographic film printer unit, the combination of means for intermittently contacting a negative film with a sensitized film at a point of exposure, a source of illumination, a light directing member, a shutter mounted between said source of illumination and the point of exposure, a light strip between the rotary shutter and the point of exposure, said light strip having a plurality of unrestricted orifices of variant predetermined diameters and means operable when the said intermittent contacting means are released for moving the said light strip to change the orifice admitting light from the source of illumination to the point of exposure.

21. In a photographic film printer unit, the combination of means for intermittently drawing a negative film and a sensitized film to a point of exposure, means for contacting the said film at the point of exposure during the stationary period of the said films, means for admitting light to the point of exposure while the films are contacted, and means operable during the travel of the film for automatically changing the light intensity to be admitted to the point of exposure, said means including an elongated light strip having a plurality of unrestricted spaced orifices of variant predetermined diameters formed therein.

22. In an apparatus of the character described, the combination of a plurality of printing units, means for causing a horizontal intermittent travel of a negative film through the said units, means for causing a horizontal intermittent travel of a sensitized film through each unit, means for admitting light of definite intensities to a point of exposure of each unit, said means comprising a member having a plurality of orifices of definite diameters formed therein.

23. In a photographic film printer unit, the combination of means for causing an intermittent travel of a negative film and a sensitized film to a point of exposure, means for contacting the film during the stopping thereof, means for decreasing or increasing the light intensity admitted to the printing region for each separate picture printed therein, said means including a member having a plurality of orifices formed therein of decreasing or increasing diameters, and means for actuating the said member after the contacting of each frame of the negative film and the sensitized film at the point of exposure.

24. In a photographic film printer, the combination of means for moving intermittently a negative and a sensitized film to and through a point of exposure, means for contacting the negative film with the sensitized film at the point of exposure, means for successively increasing or decreasing the light intensity admitted to the point of exposure for each separate print made therein, said latter means including a light strip having a plurality of unrestricted orifices of successively increasing or decreasing diameter formed therein, the orifices being formed in the light strip so that their centers are equally spaced longitudinally thereof, and means operating during the moving of the said films for actuating the light strip.

25. In a photographic film printer, the combination of means for intermittently contacting a negative film with a sensitized film at a point of exposure, a source of illumination, light directing means between the source of illumination and the point of exposure, a light strip interposed between the source of illumination and the point of exposure, said light strip including a plurality of unrestricted orifices longitudinally spaced along the said strip and formed therein of definite predetermined sizes, and means operatively connected with one of said films for actuating the light strip.

26. In combination with a film printer including means for intermittently contacting a negative film with a sensitized film at a point of exposure of the sensitized film, and a source of illumination of a light strip including an elongated strip of material interposed between the source of illumination and the point of exposure and having spaced apart unrestricted light orifices formed therein of variant predetermined sizes and spaced edge perforations, and means for driving the light strip, the latter means engaging the light strip in said edge perforations.

27. In combination with a film printer including means for intermittently contacting a negative film with a sensitized film at a point of exposure and a source of illumination, of a light strip interposed between the source of illumination and the point of exposure, said light strip including an elongated strip of material having a plurality of orifices disposed with their centers on the center line of said strip, said orifices having their centers equally spaced longitudinally of said strip, and means for driving the said strip to change the orifice through which light is admitted from the said source to the point of exposure.

28. In an apparatus of the character described, the combination of a plurality of printing units, means for causing intermittent travel of a negative film through the units, means for causing intermittent travel of a sensitized film through each unit, means for contacting the negative film with a sensitized film in each unit, and means for printing the sensitized film in each unit from the negative film during the contacting thereof.

29. In an apparatus of the character described, the combination of a plurality of printing units, means for causing intermittent travel of a sensitized film through the units, means for causing intermittent travel of a negative film through each unit, means for contacting the negative film with the sensitized film at a point of exposure, and means for admitting light to the points of exposure of the units during the contacting of the films.

30. In a film printer, the combination of means for imparting an intermittent travel to a negative film, means for imparting an intermittent travel to a sensitized film, means for connecting the films at a point of exposure, said latter means including a gate pivotally supported over the point of exposure, and providing a closure cap therefor, and a ruby glass mounted in the gate through which the operation of the printer may be observed.

31. In a film printer, the combination of means for imparting intermittent travel to a negative and a sensitized film through a point of exposure, means for contacting the films at the point of exposure, means for intermittently admitting light to the point of exposure, the contacting means including a gate pivotally supported over the point of exposure, a ruby glass mounted in the gate through which the operation may be observed, and means operatively connected with the said gate for interrupting the said intermittent film drives when the gate is opened.

32. In combination with a film printer, including means for intermittently contacting a negative film with a sensitized film at a point of exposure, a source of illumination, of a light strip including an elongated strip of material interposed between the source of illumination and the point of exposure and having spaced apart unrestricted light orifices formed therein of variant predetermined diameters, a ground glass positioned above the light strip between the source of illumination and the point of exposure, and means for driving the light strip.

33. In a device of the class described, the combination of a plurality of printer units, a negative film threaded through the printer units, means for driving the negative film to each unit, and means operatively connected with the negative film to maintain a free loop of the film in advance of each unit, a sensitized film fed through each unit, means for driving the sensitized film to the unit, and means operatively connected with the sensitized film to maintain a free loop of the sensitized film in advance of the printer unit, a source of illumination for each unit, and means for admitting light from the source of illumination to the point of exposure of each unit.

34. In a device of the class described, the combination of a plurality of printer units, a negative film stock reel, a negative take-up reel, the negative film from the stock reel being threaded through the plurality of printer units to the take-up reel, means for driving the take-up reel, a sensitized film stock reel, and a sensitized film take-up reel for each printer unit, means for driving the sensitized film and the negative film to each printer unit, means for driving the sensitive film and the negative film through each unit, and means for imparting a drag to the sensitized film and negative film in advance of each unit.

Signed at Los Angeles, California, this 8th day of May, 1924.

FREDRICK B. THOMPSON.